Figure 1:
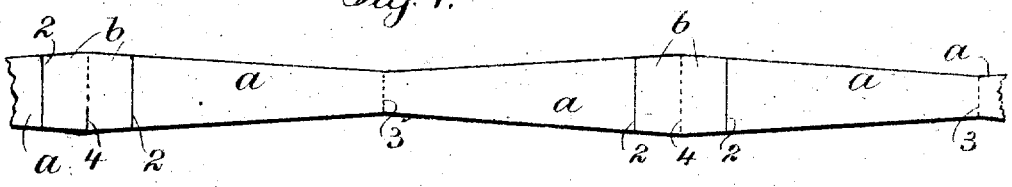
Figure 1:
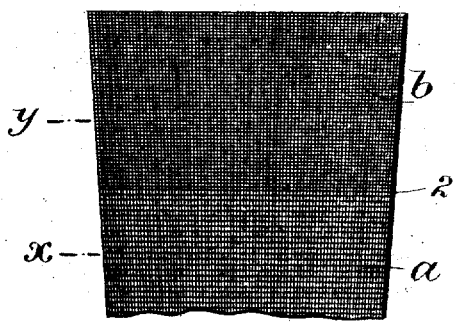

S. KOPS.

ELASTIC WEBBING.

APPLICATION FILED DEC. 9, 1908.

Reissued June 8, 1909. 12,972.

b Fig. 4 a Fig. 3.

Witnesses

Chas H Smith

A H Ferrell

Inventor

Samuel Kops by Harold Ferrell his atty

UNITED STATES PATENT OFFICE.

SAMUEL KOPS, OF NEW YORK, N. Y., ASSIGNOR TO KOPS BROS., OF NEW YORK, N. Y.

ELASTIC WEBBING.

No. 12,972. Specification of Reissued Letters Patent. Reissued June 8, 1909.

Original No. 887,654, dated May 12, 1908, Serial No. 376,088. Application for reissue filed December 9, 1908. Serial No. 466,729.

*To all whom it may concern:*

Be it known that I, SAMUEL KOPS, a citizen of the United States, residing at the borough of Manhattan, city, county, and State of New York, have invented an Improvement in Elastic Webbing, of which the following is a specification.

Elastic webbing for various uses is parallel sided and of predetermined widths within certain limits and the width of said webbing limits the length of the line of sewing or connection of the same to an article of support, consequently the strain is not distributed over as large an area as is desirable and if the elastic webbing were as wide as is desirable for distributing the strain, any connecting devices or metallic parts attached thereto would be unnecessarily wide, large, clumsy and expensive.

In the device of my invention I overcome these objections by making the elastic webbing tapering and in view of the fact that the adjustment required of any fastening device is comparatively slight, the varying width of the elastic webbing for this amount of adjustment is negligible.

I have discovered that given or predetermined lengths of elastic webbing sufficient for the desired article or use can be woven tapering so that the width at the wide part is almost double the width at the narrow part. I have also discovered that these tapering portions or lengths can be made continuous and reversed, that is, in a continuous strip in which the wide and narrow parts follow one another in succession. In other words, in which the respective tapering parts follow one another in successive and reversed positions with the narrow ends together and the wide ends together, the continuous strip being adapted to be severed either at the narrowest parts or at the widest parts, or at both places into separate elastic and non-elastic members as desired and according to the office to be performed by the same and also severed at any of said places as described. I have also discovered that the weaving can be changed as shown and described in Letters Patent #875,439, granted to me December 31, 1907, and in which I have shown and described elastic portions woven under tension at substantially the elastic limit of the completed webbing and adjacent parts that are woven without tension or under normal conditions.

I prefer to employ in connection with the tapering strip for the present application, sections that are formed between the wider ends of the tapering strips which are woven continuous with said strips and under normal conditions without tension so that while the tapering strips may be cut at the intersection of the narrower parts, the said sections woven under normal conditions may be centrally cut so as to constitute parts to be sewed into the corset or other garment, or said parts may be severed at the narrower parts only according to the office to be performed by the sections when so severed.

Figure 2:
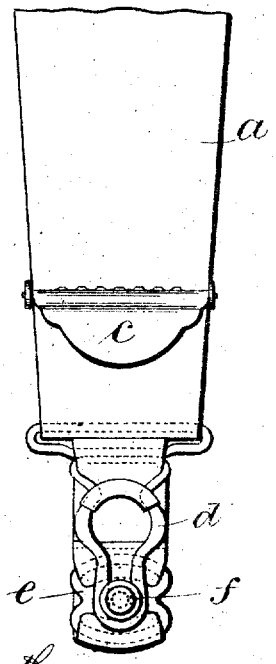

In the drawing, Figure 1 is a plan representing a strip of elastic and non-elastic webbing adapted to be cut up into various lengths. Fig. 2 is a severed or broken plan view of a hose supporter length according to my invention. Fig. 3 is a cross section at the dotted line *x, x*, of Fig. 2, and Fig. 4 is a cross section at the dotted line *y, y*, Fig. 2.

Referring to Fig. 1, *a* represents between the lines 2, 2, a length of elastic webbing woven under tension and at substantially the elastic limit of the completed webbing as usual in this art and which length is tapering between maximum and minimum widths; the minimum width or narrowest place being represented by the dotted line 3, which indicates the possible line of severance or division. The elastic webbing between the lines 2 2 is of sufficient length for the elastic portion of two hose supporters.

The sections *b b* are interposed between the sections *a a* at the wider ends of the elastic sections; said sections *b b* being short in their length in proportion to the length of the sections *a a*. These sections *b b* are woven in a normal condition and without tension; they are substantially entirely non-elastic with the elastic strands of normal proportions and because of their weaving without tension the warp threads are taut and the weft threads of the weaving are close together, compact and solid; the elastic strands of full proportions without tension being held or pinched by and between the woven strands.

Each length or section *b* woven without tension and under normal conditions is adapted to be cut up substantially at the center along the dotted line 4. The continuous woven strip illustrated in Fig. 1 is thus adapted to be cut up into lengths or sections at the dotted lines 3, at the narrower portions of the sections *a a* and at the dotted lines 4 centrally of the non-elastic sections *b b* or only at the dotted lines 3, which in this instance would leave a non-elastic section *b* between two elastic sections *a a*.

Fig. 3 shows in cross section the elastic strands and the weaving through the section *a* woven under tension, or in other words, the elastic parts, and Fig. 4 shows in section the elastic strands and the parts woven under normal conditions without tension, or in other words, the non-elastic parts.

In Fig. 2 with the fabric I have shown a clamp *c*, a loop *d*, a plate *e* and a hook *f* connected to the elastic portion of the strip and going in connection therewith to form a complete hose supporter structure. The section *b*, or in other words, the non-elastic part is adapted to be sewed to or into a corset or other garment at the desired place of attachment, to be sold for attachment to a corset or a corset-waist, or other article of apparel.

By the non-elastic part the elastic strands are held in the threads firmly, in reality pinched so that the strands in the part *a* when put under tension have a suitable anchorage in their continuous portions that are held in the part *b* so that their elasticity is even throughout; there being no risk of these elastic threads breaking or pulling down into the channels of the elastic part *a*.

In attaching the elastic webbing to a place of support or anchorage by threads which pass through the part woven under normal conditions or without tension, that is, the part or section *b*, the threads pass through a part in which there is no give or stretch; the fabric being rigid. Therefore a rigid part of the webbing is connected to a rigid part of the garment or other part to which the webbing is attached and the pull is upon the portion *a* woven under tension from the part woven without tension, with the result that there is no breaking of the elastic strands or pulling out of the fabric.

I claim as my invention:—

1. An elastic webbing consisting of a flat strip formed narrow at one end and wide at the other, said strip being woven under tension and a part forming a continuation thereof from the wide end of the webbing woven under normal conditions without tension, the narrow end being adapted for connection with parts of a supporting device and the wide end to be sewed or otherwise secured into position for use.

2. An elastic webbing consisting of a flat strip formed narrow at one end and wide at the other, said strip being woven under tension and a part forming a continuation thereof from the wide end of the webbing woven under normal condition without tension in which the elastic strands of normal cross sectional area are held firmly in position, the narrow end of the elastic fabric being adapted for connection with the engaging parts of a supporter device, and the wide non-elastic end adapted to be sewed to a garment or other apparel in position for use.

3. An elastic webbing formed of a continuous strip of series of alternating sections, one series of alternating sections being formed of elastic webbing woven under tension and of predetermined length and tapering between maximum and minimum widths, and intermediate sections from the wider ends of said parts, woven under normal conditions without tension, either or all of the sections of the series being adapted to be severed centrally to form a tapering webbing for the desired use.

4. A length of elastic webbing adapted to be cut up and comprising alternate sections of predetermined length and tapering throughout their length between maximum and minimum widths, which are loose woven or with spaced weft threads and adapted to yield under tension and alternate short sections tight woven, or with close weft threads so as to be substantially non-elastic, the said length of webbing adapted to be severed at any or all of the intermediate points in the respective sections.

5. An elastic webbing formed of a continuous strip of series of alternate sections, one series of alternate sections being formed of elastic webbing woven under tension and the other series of alternate and intermediate sections woven under normal conditions without tension, each of said sections being tapering between maximum and minimum widths and the said strip being adapted to be severed through any one or more sections.

6. An elastic webbing formed of a continuous strip of series of alternate sections, one series of alternate sections being formed of elastic webbing woven under tension and the other series of alternate and intermediate sections woven under normal conditions without tension, each of said sections being tapering between maximum and minimum widths, and the continuous strip of any desired width or inclination of taper.

7. An elastic webbing formed of a continuous strip of series of alternate sections, one series of alternate sections being formed of elastic webbing woven under tension and the other series of alternate and intermediate sections woven under normal conditions without tension, each of the said sections tapering between maximum and minimum widths from about the center thereof and the said strip being adapted to be severed through approximately the center of any one or more sections.

Signed by me this 14th day of October 1908.

SAMUEL KOPS.

Witnesses:
ROBERT VOL KAAN,
JULIUS KOBBEY.